United States Patent
Allen et al.

(10) Patent No.: US 10,169,490 B2
(45) Date of Patent: *Jan. 1, 2019

(54) QUERY DISAMBIGUATION IN A QUESTION-ANSWERING ENVIRONMENT

(71) Applicant: International Business Machines Corporation, Armonk, NY (US)

(72) Inventors: Corville O. Allen, Morrisville, NC (US); Claire L. Kohler, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/864,218

(22) Filed: Sep. 24, 2015

(65) Prior Publication Data

US 2016/0259863 A1 Sep. 8, 2016

Related U.S. Application Data

(63) Continuation of application No. 14/634,929, filed on Mar. 2, 2015.

(51) Int. Cl.
*G06F 17/30* (2006.01)
*G06F 17/27* (2006.01)

(52) U.S. Cl.
CPC ...... *G06F 17/30976* (2013.01); *G06F 17/271* (2013.01); *G06F 17/30654* (2013.01)

(58) Field of Classification Search
None
See application file for complete search history.

(56) References Cited

U.S. PATENT DOCUMENTS

| 5,519,608 | A  | * | 5/1996 | Kupiec   | G06F 17/3064 704/9 |
| 6,182,062 | B1 | * | 1/2001 | Fujisawa | G06F 17/271 |
| 8,700,653 | B2 | * | 4/2014 | Hansson  | G06F 17/3064 707/731 |
| 8,719,008 | B2 | * | 5/2014 | Kinder   | G06F 17/274 704/1 |

(Continued)

OTHER PUBLICATIONS

Allen et al., "Query Disambiguation in a Question-Answering Environment," U.S. Appl. No. 14/634,929, filed Mar. 2, 2015.

(Continued)

*Primary Examiner* — Mark D Featherstone
*Assistant Examiner* — Ranjit P Doraiswamy
(74) *Attorney, Agent, or Firm* — Daniel C. Housley (57) ABSTRACT

Query disambiguation can include identifying, a first set of word clusters in a first candidate answer generated in response to a first input query for a question-answering system. Each of the first set of word clusters can be classified according to a syntactic element of a first set of syntactic elements. Query disambiguation can include identifying, in the first input query, a second set of word clusters. Each of the second set of word clusters can be classified according to a syntactic element of a second set of syntactic elements. Query disambiguation can include determining that the first word cluster is classified according to a first syntactic element that is not present in the second set of syntactic elements and generating a second input query using the first input query and the first word cluster.

16 Claims, 6 Drawing Sheets

(56) References Cited

U.S. PATENT DOCUMENTS

| | | | |
|---|---|---|---|
| 2006/0053000 A1* | 3/2006 | Moldovan | G06F 17/2785 704/9 |
| 2006/0235689 A1* | 10/2006 | Sugihara | G06F 17/2785 704/257 |
| 2009/0070311 A1* | 3/2009 | Feng | G06F 17/30654 |
| 2010/0005081 A1 | 1/2010 | Bennett | |
| 2012/0005219 A1* | 1/2012 | Apacible | G06F 17/30675 707/768 |
| 2012/0078888 A1* | 3/2012 | Brown | G06F 17/30654 707/723 |
| 2012/0301864 A1* | 11/2012 | Bagchi | G09B 7/02 434/362 |
| 2013/0246046 A1* | 9/2013 | Fan | G06F 17/2785 704/9 |
| 2014/0072948 A1 | 3/2014 | Boguraev et al. | |
| 2014/0163962 A1 | 6/2014 | Castelli et al. | |
| 2014/0280107 A1* | 9/2014 | Heymans | G06F 17/30867 707/727 |

OTHER PUBLICATIONS

List of IBM Patents or Patent Applications Treated as Related, Signed Sep. 23, 2015, 2 pages.

* cited by examiner

QUERY DISAMBIGUATION IN A QUESTION-ANSWERING ENVIRONMENT

BACKGROUND

The present disclosure relates to question-answering systems, and more specifically, to input query disambiguation based on candidate answers in a question-answering environment.

Question-answering (QA) systems can be designed to receive input questions, analyze them, and return applicable answers. Using various techniques, QA systems can provide mechanisms for searching corpora (e.g., databases of source items containing relevant content) and analyzing the corpora to determine answers to an input question.

SUMMARY

According to embodiments of the present disclosure, a computer-implemented method of query disambiguation in a question-answering environment is disclosed. The method can include identifying, using a first natural language processing technique, a first set of word clusters in a first candidate answer generated in response to a first input query for a question-answering system. The first set of word clusters can include a first word cluster, each of the first set of word clusters can be classified according to a syntactic element of a first set of syntactic elements. The method can include identifying, using the first natural language processing technique, in the first input query, a second set of word clusters. Each of the second set of word clusters can be classified according to a syntactic element of a second set of syntactic elements. The method can include determining, by comparing the first and second sets of syntactic elements, that the first word cluster is classified according to a first syntactic element that is not present in the second set of syntactic elements. The method can include generating, using a second natural language processing technique, a second input query using the first input query and the first word cluster.

Embodiments of the present disclosure are directed towards a system for query disambiguation in a question-answering environment. The system can include a processor and a computer readable storage medium having program instructions embodied therewith. The program instructions can be executable by the processor to cause the system to identify, using a first natural language processing technique, a first set of word clusters in a first candidate answer generated in response to a first input query for a question-answering system. The first set of word clusters can include a first word cluster, and each of the first set of word clusters can be classified according to a syntactic element of a first set of syntactic elements. The program instructions can be executable by the processor to cause the system to identify, using the first natural language processing technique, in the first input query, a second set of word clusters. Each of the second set of word clusters can be classified according to a syntactic element of a second set of syntactic elements. The program instructions can be executable by the processor to cause the system to determine, by comparing the first and second sets of syntactic elements, that the first word cluster is classified according to a first syntactic element that is not present in the second set of syntactic elements. The program instructions can be executable by the processor to cause the system to generate, using a second natural language processing technique, a second input query using the first input query and the first word cluster.

Embodiments of the present disclosure are directed towards a computer program product for query disambiguation in a question-answering environment. The computer program product can include a computer readable storage medium having program instructions embodied therewith, the program instructions executable by a computer to cause the computer to perform a method. The method can include identifying, by the computer, using a first natural language processing technique, a first set of word clusters in a first candidate answer generated in response to a first input query for a question-answering system. The first set of word clusters can include a first word cluster. Each of the first set of word clusters can be classified according to a syntactic element of a first set of syntactic elements. The method can include identifying, by the computer, using the first natural language processing technique, in the first input query, a second set of word clusters. Each of the second set of word clusters can be classified according to a syntactic element of a second set of syntactic elements. The method can include determining, by the computer, by comparing the first and second sets of syntactic elements, that the first word cluster is classified according to a first syntactic element that is not present in the second set of syntactic elements. The method can include generating, by the computer, using a second natural language processing technique, a second input query using the input query and the first word cluster.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to question-answering systems, more particular aspects relate to input query disambiguation based on candidate answers in a question-answering environment. While the present disclosure is not necessarily limited to such applications, various aspects of the disclosure may be appreciated through a discussion of various examples using this context.

In a QA system, a set of candidate answers can be generated in response to input queries (e.g., questions). For example, a QA system could be configured to receive an input query, analyze the input query and one or more data sources, and based on the analysis, generate the set of candidate answers (e.g., answers).

In embodiments, a user can submit the input query to the QA system in natural language format. For example, a user could submit an input query in text form asking "how do I stop burning rice?" The system can perform natural language analysis of the submitted input query to understand the question and generate candidate answers.

However, in some instances, natural language can be confusing and/or ambiguous. For example, if the input query "how do I stop burning rice?" is posed to the QA system, the system could interpret the input query in various different ways. For example, is there a rice field that is burning? Do you have a bag of rice grains that is on fire? Are you cooking rice on the stove, and burning it?

In embodiments, a QA system can be configured to deal with ambiguous input queries in various ways. For example, in some instances a QA system could be configured to generate various possible answers and rank each one in the order in which the system believes is correct. However, this approach can be noisy, can return too many answers, and can produce answers that are nonsensical to the user. For example, if a user submits the input query "how do I stop burning rice?" and is seeking an answer related to cooking rice on a stove, then being presented with answers directed towards extinguishing a fire would likely be unhelpful.

In some instances, the system could be configured to return a list of clarifying words to the user that are related to one or more keywords in the original question. The user could then be asked to pick out one of the clarifying words to search. However, in some instances a user could have abstained from using the presented clarifying words precisely because they don't know the meaning of those clarifying words. Thus, asking a user to choose a word from the list of keywords could prove frustrating. Additionally, user frustration could arise if the system has too many disambiguation options for a single term, and the user is forced to look through dozens of similar words or phrases before they can complete their search.

Further, this approach can be difficult to implement when the input query is submitted as a natural language sentence. In the example, "how do I stop burning rice?", none of the words are individually confusing. Rather, the sentence as a whole lacks could lack sufficient context.

Embodiments of the present disclosure are directed towards input query disambiguation in a QA environment. In embodiments, input query disambiguation can be used to determine context for an input query. Context can be used to understand and answer a potentially confusing question. In embodiments, context are elements of language that precede and/or follow a word or passage which clarify meaning. For example, a context for the question of "how do I stop burning rice?" could be "on the stove". The context of "on the stove" could clarify to a recipient of the question that the rice is being cooked on the stove and that answers to the question should be related to the domain of cooking.

Described further herein, in embodiments, query disambiguation includes using context to generate additional input queries for a user.

In embodiments, a method of query disambiguation can include identifying, using a first natural language processing technique, a first set of word clusters in a candidate answer to a first input query for a question-answering system.

In embodiments, word clusters are groups of one or more words in a natural language text. For example, the input query of "what drugs are used for diabetes?" could be broken up into a plurality of word clusters including a first word cluster "what drugs", a second word cluster "are used for", and a third word cluster "diabetes".

In embodiments, each of the first set of word clusters are defined by syntactic elements of the natural language text. In embodiments, syntactic elements are elements of natural language which correspond to the structure of words and phrases. For example, in embodiments, syntactic elements can be parts of speech. In embodiments, the size and location of word clusters in the natural language text is based on the word cluster's syntactic functions.

For example, for the input query of "what drugs are used for diabetes?", the subject of the input query, "what drugs" could be a first word cluster. The verb of the input query "are used for" could be a second word cluster. An object of the input query, "diabetes" could be a third word cluster. In embodiments, the word clusters can be classified according to parts of speech including, but not limited to, nouns, pronouns, subjects, objects, adjectives, determiners, verbs, adverbs, prepositions, conjunctions, and interjections.

In embodiments, the method can include identifying, using the natural language processing technique, in the input query, a second set of word clusters, each of the second set of word clusters classified according to a syntactic element of a second set of syntactic elements. In embodiments, the method can include determining, by comparing the first and second sets of syntactic elements, that a first word cluster of the second set of word clusters is classified according to a syntactic element not present in the first set of syntactic elements.

In embodiments, described further herein, the method can include generating, using a second natural language processing technique, a second input query using the first input query and the first word cluster.

Figure 1:
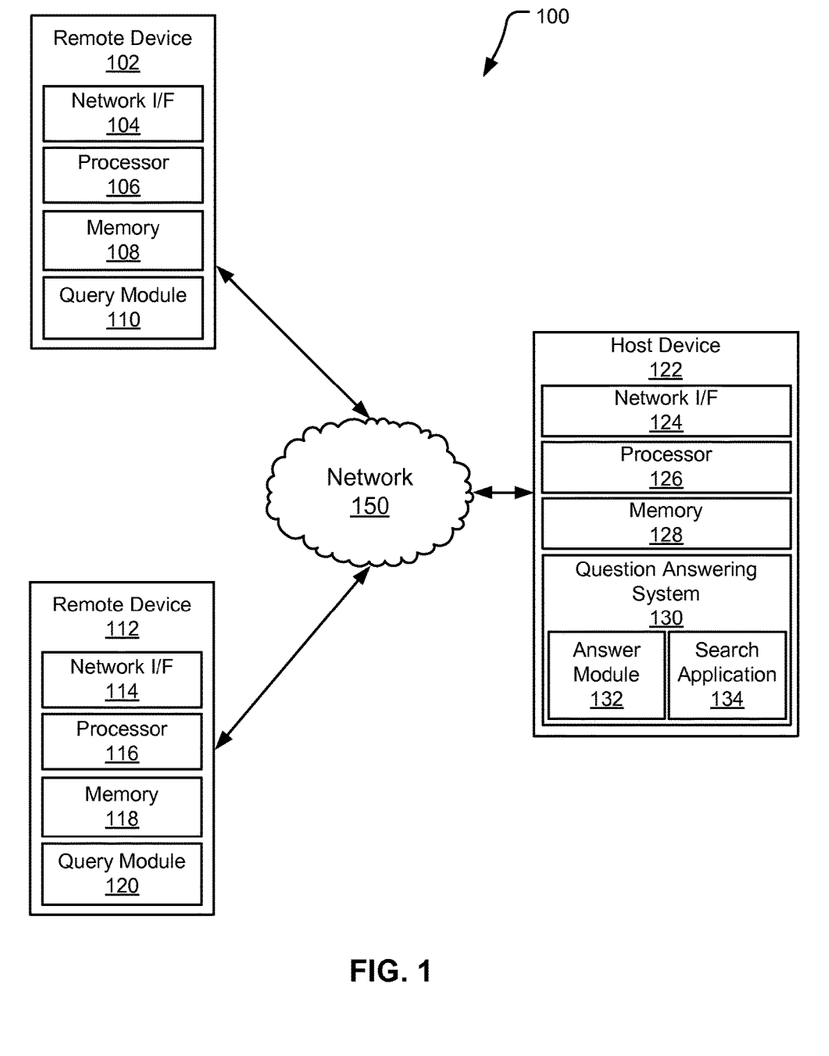
FIG. 1 depicts a block diagram of an example computing environment for use with a question-answering (QA) system, according to embodiments of the present disclosure.

Referring now to FIG. 1 a block diagram of an example computing environment 100 for use with a QA system can be seen, according to embodiments of the present disclosure. In some embodiments, the computing environment 100 can include one or more remote devices 102, 112 and one or more host devices 122. Remote devices 102, 112 and host device 122 can be distant from each other and communicate over a network 150. In embodiments, the host device 122 can be a central hub from which remote devices 102, 112 establish a communication connection. In embodiments, the host device and remote devices can be configured in various suitable relationships (e.g., in a peer-to-peer or other relationship).

In some embodiments, the network 150 can be implemented by suitable communications media (e.g., wide area network (WAN), local area network (LAN), Internet, and Intranet). In some embodiments, remote devices 102, 112 and host devices 122 can be local to each other, and communicate via appropriate local communication medium (e.g., local area network (LAN), hardwire, wireless link, Intranet). In some embodiments, the network 150 can be implemented within a cloud computing environment, or using one or more cloud computing services. Consistent with various embodiments, a cloud computing environment can include a network-based, distributed data processing system that provides one or more cloud computing services. Further, a cloud computing environment can include multiple computers (e.g., hundreds or thousands of them or more), disposed within one or more data centers and configured to share resources over the network 150.

In some embodiments, host device 122 can include a QA system 130 having a search application 134 and an answer module 132. The search application 134 can be configured to search one or more databases or other computer systems for content that is related to an input query by a user at a remote device 102, 112.

In some embodiments, remote devices 102, 112 can enable users to submit input queries (e.g., search requests or other user queries) to host device 122 to retrieve search results. For example, the remote devices 102, 112 can include a query module 110, 120 (e.g., in the form of a web browser or other suitable software module) and present a graphical user interface or other interface (command line prompts, menu screens, etc.) to solicit queries from users for submission to one or more host devices 122 and to display answers/results obtained from the host devices 122 in relation to such user queries (e.g., answer sequences).

Consistent with various embodiments, host device 122 and remote devices 102, 112 can be computer systems, and can each be equipped with a display or monitor. The computer systems can include at least one processor 106, 116, 126; memories 108, 118, 128; internal or external network interface or communications devices 104, 114, 124 (e.g., modem, network interface cards); optional input devices (e.g., a keyboard, mouse, touchscreen, or other input device); and commercially available or custom software (e.g., browser software, communications software, server software, natural language processing software, search engine and/or web crawling software, filter modules for filtering content based upon predefined criteria). In some embodiments, the computer systems can include servers, desktops, laptops, and hand-held devices. In addition, the answer module 132 can include one or more modules or units to perform the various functions of embodiments as described below, and can be implemented by a combination of software and/or hardware modules or units.

Figure 2:
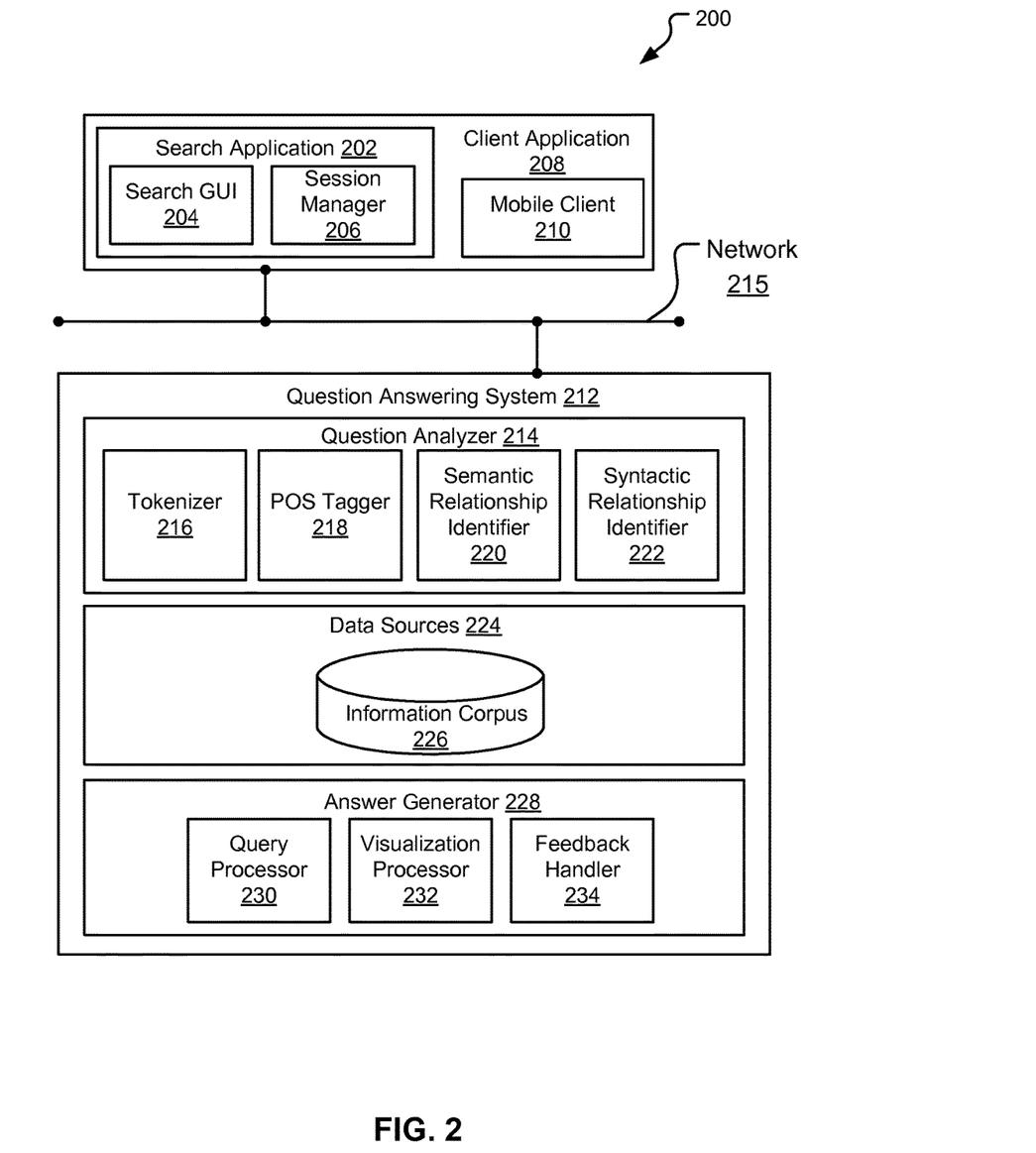
FIG. 2 depicts a block diagram of an example QA system configured to generate answers in response to one or more input queries, according to embodiments of the present disclosure.

Referring now to FIG. 2 a block diagram of a QA system can be seen, according to embodiments of the present disclosure. Aspects of FIG. 2 are directed toward a system architecture 200, including a QA system 212 to generate candidate answers in response to an input query. In some embodiments, one or more users can send requests for information to QA system 212 using a remote device (such as remote devices 102, 112 of FIG. 1). The remote device can include a client application 208 which can include one or more entities operable to generate information that is dispatched to QA system 212 via network 215. QA system 212 can be configured to perform methods and techniques for responding to the requests sent by the client application 208. In some embodiments, the information received at QA system 212 can correspond to input queries received from users, where the input queries can be expressed in natural language, images, or in other forms.

An input query (similarly referred to herein as a question) can be one or more words that form a search term or request for data, information, or knowledge. A question can be expressed in the form of one or more keywords. Questions can include various selection criteria and search terms. A question can be composed of complex linguistic features in addition to keywords. However, a keyword-based search for answers can also be possible. In some embodiments, using restricted syntax for questions posed by users can be enabled. The use of restricted syntax can result in a variety of alternative expressions that assist users in better stating their needs. In some embodiments, questions can be implied (rather than explicit) questions. Furthermore, in some embodiments, questions can be audio-type (e.g., spoken-word recordings, music, scientific sound recordings), video-type (e.g., a film, a silent movie, a video of a person asking a detailed question), image-type (e.g., a picture, a photograph, a drawing), or other type that can be received and processed by the QA system.

In some embodiments, client application 208 can operate on a variety of devices. Such devices can include, but are not limited to, mobile and hand-held devices (e.g., laptops, mobile phones, personal or enterprise digital assistants, and the like), personal computers, servers, or other computer systems that can access the services and functionality provided by QA system 212. In some embodiments, client application 208 can include one or more components, such as a mobile client 210. Mobile client 210, acting as an agent of client application 208, can dispatch user query requests to QA system 212.

Consistent with various embodiments, client application 208 can also include a search application 202, either as part of mobile client 210 or separately, that can perform several functions, including some or all of the above functions of mobile client 210 listed above. For example, in some embodiments, search application 202 can dispatch requests for information to QA system 212. In some embodiments, search application 202 can be a client application to QA system 212. Search application 202 can send requests for answers to QA system 212. Search application 202 can be installed on a personal computer, a server, or other computer system.

In some embodiments, search application 202 can include a search graphical user interface (GUI) 204 and session manager 206. In such situations, users can be able to enter questions in search GUI 204. In some embodiments, search GUI 204 can be a search box or other GUI component, the content of which can represent a question to be submitted to QA system 212. Users can authenticate to QA system 212 via session manager 206. In some embodiments, session manager 206 can keep track of user activity across sessions of interaction with the QA system 212. Session manager 206 can also keep track of what questions are submitted within the lifecycle of a session of a user. For example, session manager 206 can retain a succession of questions posed by a user during a session. In some embodiments, answers produced by QA system 212 in response to questions posed throughout the course of a user session can also be retained. Information for sessions managed by session manager 206 can be shared between various computer systems and devices.

In some embodiments, client application 208 and QA system 212 can be communicatively coupled through network 215, e.g., the Internet, intranet, or other public or private computer network. In some embodiments, QA system 212 and client application 208 can communicate by using Hypertext Transfer Protocol (HTTP) or Representational State Transfer (REST) calls. In some embodiments, QA system 212 can reside on a server node. Client application 208 can establish server-client communication with QA system 212 or vice versa. In some embodiments, the network 215 can be implemented within a cloud computing environment, or using one or more cloud computing services.

Consistent with various embodiments, QA system 212 can respond to a request for information sent by client applications 208 (e.g., question posed by a user). QA system 212 can generate candidate answers in response to the request. In some embodiments, QA system 212 can include a question analyzer 214, data sources 224, and answer generator 228.

Question analyzer 214 can be a computer module that analyzes the received questions. Question analyzer 214 can perform various methods and techniques for analyzing the questions (syntactic analysis, semantic analysis, image recognition analysis, etc.). In some embodiments, question analyzer 214 can parse received questions. Question analyzer 214 can include various modules to perform analyses of received questions. For example, computer modules that question analyzer 214 can encompass include, but are not limited to, a tokenizer 216, part-of-speech (POS) tagger 218, semantic relationship identifier 220, and syntactic relationship identifier 222.

In some embodiments, tokenizer 216 can be a computer module that performs lexical analysis. Tokenizer 216 can convert a sequence of characters into a sequence of tokens. A token can be a string of characters typed by a user and categorized as a meaningful symbol. Further, in some embodiments, tokenizer 216 can identify word boundaries in an input query and break the question or text into its component parts such as words, multiword tokens, numbers, and punctuation marks. In some embodiments, tokenizer 216 can receive a string of characters, identify the lexemes in the string, and categorize them into tokens.

Consistent with various embodiments, POS tagger 218 can be a computer module that marks up a word in a text to correspond to a particular part of speech. POS tagger 218 can read a question or other text in natural language and assign a part of speech to each word or other token. POS tagger 218 can determine the part of speech to which a word corresponds based on the definition of the word and the context of the word. The context of a word can be based on its relationship with adjacent and related words in a phrase, sentence, question, or paragraph. In some embodiments, the context of a word can be dependent on one or more previously posed questions. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, POS tagger 218 can tag or otherwise annotate tokens of a question with part of speech categories. In some embodiments, POS tagger 218 can tag tokens or words of a question to be parsed by QA system 212.

In some embodiments, semantic relationship identifier 220 can be a computer module that can identify semantic relationships of recognized entities (e.g., words, phrases) in questions posed by users. In some embodiments, semantic relationship identifier 220 can determine functional dependencies between entities and other semantic relationships.

Consistent with various embodiments, syntactic relationship identifier 222 can be a computer module that can identify syntactic relationships in a question composed of tokens posed by users to QA system 212. Syntactic relationship identifier 222 can determine the grammatical structure of sentences, for example, which groups of words are associated as "phrases" and which word is the subject or object of a verb. Syntactic relationship identifier 222 can conform to formal grammar.

In some embodiments, question analyzer 214 can be a computer module that can parse a received user query and generate a corresponding data structure of the user query. For example, in response to receiving a question at QA system 212, question analyzer 214 can output the parsed question as a data structure. In some embodiments, the parsed question can be represented in the form of a parse tree or other graph structure. To generate the parsed question, question analyzer 214 can trigger computer modules 216-222. Additionally, in some embodiments, question analyzer 214 can use external computer systems for dedicated tasks that are part of the question parsing process.

In some embodiments, the output of question analyzer 214 can be used by QA system 212 to perform a search of a set of (i.e., one or more) corpora to retrieve information to answer a question posed by a user. As used herein, a corpus can refer to one or more data sources. In some embodiments, data sources 224 can include databases, information corpora, data models, and document repositories. In some embodiments, the data source 224 can include an information corpus 226. The information corpus 226 can enable data storage and retrieval. In some embodiments, the information corpus 226 can be a storage mechanism that houses a standardized, consistent, clean and integrated form of data. The data can be sourced from various operational systems. Data stored in the information corpus 226 can be structured in a way to specifically address reporting and analytic requirements. In some embodiments, the information corpus can be a relational database. In some example embodiments, data sources 224 can include one or more document repositories.

In some embodiments, answer generator 228 can be a computer module that generates the candidate answers in response to posed questions. Examples of answers generated by answer generator 228 can include, but are not limited to, natural language sentences, reports, charts, or other analytic representation, raw data, web pages, and the like. In some embodiments, answers can be of audio type, image type, or other suitable medium type.

In some embodiments, answer generator 228 can include query processor 230, visualization processor 232, and feedback handler 234. When information in the data source 224 matching a parsed question is located, a technical query associated with the pattern can be executed by query processor 230. Based on data retrieved by a technical query executed by query processor 230, visualization processor 232 can be configured to organize the retrieved answers. In embodiments, the visualization processor 232 can be a visualization processor configured to render a visualization of the organized answers. In embodiments, the rendered visualization of the answers can represent the answer to the input query. In some embodiments, visualization processor 232 can organize the answers according to various forms including, but not limited to, images, charts, tables, dashboards, maps, and the like.

In some embodiments, feedback handler 234 can be a computer module that processes feedback from users on answers generated by answer generator 228. In some embodiments, users can be engaged in dialog with the QA system 212 to evaluate the relevance of received answers. For example, the answer generator 228 could produce the candidate answers corresponding to a question submitted by a user. The user could rank each answer according to its relevance to the question. In some embodiments, the feedback of users on generated answers can be used for future question answering sessions.

The various components of the QA system described herein can be used to implement various aspects of the present disclosure. For example, the client application 208 could be used to receive an input query from a user. The question analyzer 214 could, in some embodiments, be used to analyze input queries and to generate the candidate answers based on the input query. The answer generator 228 could, in some embodiments, be used to render visualization of the candidate answers to generate an answer sequence for presentation to the user.

Figure 3:
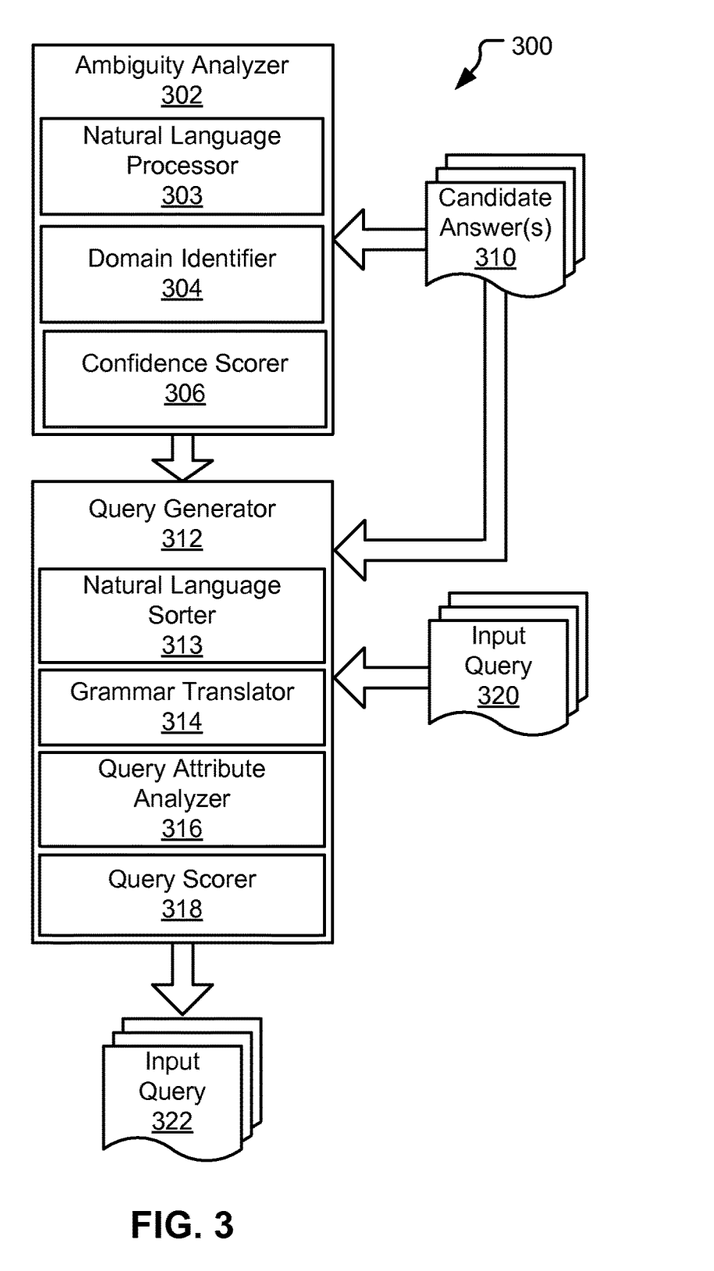
FIG. 3 depicts a system architecture configured for input query disambiguation in a question-answering environment, according to embodiments of the present disclosure.

Referring now to FIG. 3, a system architecture 300 for input query disambiguation in a QA environment can be seen, according to embodiments of the present disclosure. The system architecture 300 can represent an example architecture for a system, such as a QA system, configured to execute embodiments of the present disclosure. For example, the system architecture 300 could be an example representation of one or more aspects of the question answering system 212 (FIG. 2).

In embodiments, the system architecture 300 can include an ambiguity analyzer 302 and a query generator 312.

The ambiguity analyzer 302 can be configured to determine whether an input query is ambiguous. As described herein, natural language can be confusing and/or misleading. For example, the input query "how do I stop burning rice?" is, in some instances, ambiguous because it could be interpreted as requesting answers related to different topics (e.g. cooking and fire prevention).

In embodiments, the ambiguity analyzer 302 can be configured to analyze a set of candidate answers 310 generated in response to the input query and determine, using a set of ambiguity criteria, whether the input query is potentially ambiguous. In embodiments, ambiguity criteria can be various standards used by the ambiguity analyzer 302 to determine whether additional input queries, such as a second input query 322, should be generated by the query generator 312. Described further herein, in embodiments, the set of ambiguity criteria includes a first ambiguity criterion based on a number of domains (e.g. topics, concepts, etc.) in the set of candidate answers 310. In certain embodiments, the set of ambiguity criteria can include a second ambiguity criterion based on confidence values for the set of candidate answers. In some embodiments, the set of ambiguity criteria can include various other suitable standards.

In embodiments, the ambiguity analyzer 302 can include a natural language processor 303, a domain identifier 304, and a confidence scorer 306.

In embodiments, the natural language processor 303 can be configured to perform various methods and techniques for natural language analysis of data in a QA system, as described herein. For example, the natural language processor 304 can be configured to perform syntactic analysis, semantic analysis, image recognition analysis, concept matching, and other suitable methods and techniques as described herein. In embodiments, the natural language processor 303 can include a tokenizer, a POS tagger, a semantic relationship identifier, and a syntactic relationship identifier, as described herein with reference to FIG. 2.

The natural language processor 303 can be configured to identify word clusters in the set of candidate answers 310. As described herein, word clusters are groups of one or more words that make up a natural language sentence or passage. In embodiments, word clusters are defined according to syntactic elements of the natural language passages in the set of candidate answers. As described herein, in embodiments, the syntactic elements are parts of speech. For example, in certain embodiments, the natural language processor 303 can be configured to identify the parts of speech of natural language passages in the set of candidate answers and, from the identified parts of speech, identify word clusters.

For example, the sentence, "what drugs are used for diabetes?" could be broken into three word clusters based on parts of speech. "What drugs" could be a first word cluster classified as a subject, "are used for" could be a second word cluster classified as a verb, and "diabetes" could be a third word cluster classified as an object.

The domain identifier 304 can be configured to identify a set of domains from word clusters identified in the set of candidate answers. In embodiments, the set of domains is a set of specific topics (e.g. spheres of knowledge and/or concepts) that are identified in the set of candidate answers 310.

In embodiments, the domain identifier 304 can identify distinct contexts from word clusters in the set of candidate answers 310. For example, candidate answers generated in response to an input query of "what drugs are used for diabetes?" could include natural language passages and word clusters which are related to type 2 diabetes and multiple word clusters which are related to type 1 diabetes. In an additional example, candidate answers generated in response to an input query of "how do I stop burning rice?" could include multiple word clusters which related to cooking and multiple word clusters which are related to fire prevention. In both examples, at least two distinct domains (e.g. cooking and fire prevention, or type 1 diabetes and type 2 diabetes) could be identified from the set of candidate answers.

In embodiments, the domain identifier 304 can use natural language processing techniques as described herein to identify whether word clusters of the set of word clusters are related to a domain. For example, in embodiments, the domain identifier 304 can use concept matching techniques to determine whether word clusters are related to a domain. Concept matching techniques can include, but are not limited to, semantic similarity, syntactic analysis, and ontological matching.

For example, in embodiments, the domain identifier 304 could be configured to parse the word clusters of the set of candidate answers 310 to determine semantic features (e.g. repeated words, keywords, etc.) and/or syntactic features (e.g. location of semantic features in headings, title, etc.). Ontological matching could be used to map semantic and/or syntactic features to a particular concept. Each particular concept could be used as a domain in the set of domains.

In embodiments, the ambiguity analyzer 302 can use a number of domains in the set of domains to determine whether the input query satisfies a first ambiguity criterion of the set of ambiguity criteria, as described herein. In embodiments, the first ambiguity criterion includes comparing the number of the domains to a threshold value. In embodiments, if the number of domains exceeds the threshold value then the first ambiguity criterion is satisfied. In embodiments, a greater number of domains identified in the set of candidate answers indicates that the input question generated candidate answers which are related to different fields. Accordingly, in some instances, the greater the number of domains identified in the set of candidate answers the higher the likelihood of ambiguity in the first input query 320. In certain embodiments, if the number of domains is less than the threshold value then the first ambiguity criterion is satisfied. In some embodiments, the threshold can be based on a ratio of the number of domains to the number of candidate answers in the set of candidate answers. For example, in embodiments, the ambiguity criteria could be satisfied if the number of domains was twenty percent or greater than the number of candidate answers.

In embodiments, the confidence scorer 306 is configured to determine confidence values for the set of candidate answers. In embodiments, confidence values are values assigned to each of the set of candidate answers 310 that indicate a QA system's relative confidence of the likelihood of candidate answers being correct. For example, in embodiments, the confidence scorer 306 could be configured to assign a value between 0 and 100 to each candidate answer. In embodiments, a value of 0 could indicate a small likelihood of the candidate answer being correct and a value of 100 could indicate a large likelihood of the candidate answer being correct. In embodiments, the confidence scorer 306 can be any suitable confidence value generator for candidate answers in a QA system.

In embodiments, the ambiguity analyzer 302 can use the confidence values for the set of candidate answers 310 to determine whether the input query 320 satisfies a second ambiguity criterion of the set of ambiguity criteria. In embodiments, the higher a QA system's confidence in a candidate answer, the greater the likelihood that the system provided a correct answer to the first input query. Accordingly, in some instances, the higher the confidence values for the set of candidate answers 310 the less the likelihood of ambiguity in the first input query 310.

In embodiments, the second ambiguity criterion can include comparing an amalgamated confidence value from the confidence scorer 306 to a threshold value. In embodiments the amalgamated confidence value could be an average confidence value for the set of candidate answers. In some embodiments, the amalgamated confidence value could be an average confidence value for a portion (such as the top 10%) of the confidence values. In embodiments, if the aggregated confidence value exceeds the threshold value then the second ambiguity criterion is satisfied. In certain embodiments, if the aggregated confidence value is less than the threshold value then the second ambiguity criterion is satisfied.

In embodiments, if the set of ambiguity criteria is satisfied, then the ambiguity analyzer 302 can determine that the input query 320 is ambiguous. In embodiments, the ambiguity analyzer 302 can then active the query generator 312 to generate a second input query, described further herein.

The query generator 312 can be configured to disambiguate the first input query 320 using context from the set of candidate answers 310. For example, in embodiments, the query generator 312 can be configured to generate a second input query 322 based on the set of candidate answers 310 and the first input query 320. The second input query 322 can include changed context and/or additional context that can assist in clarifying the second input query 322 relative to the first input query 320, as described herein. The query generator 312 can include a natural language sorter 313, a grammar translator 314, a query attribute analyzer 316, and a query scorer 318.

The natural language sorter 313 can be configured to identify suitable word clusters for generation of the second input query 322. In embodiments, the set of candidate answers can include various natural language text and passages which can be used for query disambiguation. Thus, in some instances, the natural language passages of the input query can be sorted (e.g. filtered) to identify particular natural language passages that contain word clusters which are more suitable for input query disambiguation than others.

In embodiments, the natural language sorter 313 can be configured to identify natural language passages in the set of candidate answers 310 that are syntactically and/or semantically similar to first input query 320. The natural language sorter 313 can identify word clusters from the similar natural language passages to find word clusters which are suitable for context disambiguation with the first input query 320.

In embodiments, the natural language sorter 313 can use a natural language processing technique to determine that natural language passages of the set of candidate answers 310 are syntactically and/or semantically similar to the first input query 320. For example, in embodiments, the natural language sorter 313 can use a slot grammar parser to analyze natural language passages of the set of candidate answers 310 to identify syntactic elements and/or semantic terms. The natural language sorter 313 can be configured to compare the identified syntactic elements to identify natural language passages that are suitable for disambiguation of the first input query 320.

For example, the input query "What drugs are used for diabetes?" contains syntactic elements arranged in order of subject verb and object. The natural language sorter 313 could identify in one or more candidate answers, natural language passages, which share similar syntactic elements arranged in a similar order. For example, a candidate answer could include a natural language passage of "Often times, patients will wonder what drugs are prescribed for type 2 diabetes." The natural language passage includes similar parts of speech including a subject, verb, and object, along with additional parts of speech including a preposition and an adjective. Additionally, the natural language passage includes a similar order of syntactic elements, with the subject coming prior to the verb, and the verb coming prior to the object.

In embodiments, the natural language sorter 313 can determine whether natural language sentences have similar syntactic elements and a similar order based on a set of similarity criteria. In embodiments, the set of similarity criteria can be various standards used to determine the similarity of syntactic elements and order of syntactic elements. For example, the set of similarity criteria could include a first similarity criterion that the first input query 320 and a natural language passage have similar syntactic elements when they share at least 80% of the same parts of speech. In an additional example, the set of similarity criteria could include a second similarity criterion that the first input query 320 and a natural language passage have a similar order of syntactic elements when they share 50% of syntactic elements in the same order.

In embodiments, the natural language sorter 313 can be configured to identify a first set of word clusters from the natural language passages that satisfy the set of similarity criteria. In embodiments, the natural language sorter 313 can identify word clusters in the same or substantially similar manner as the natural language processor 303.

For example, the natural language sorter 313 can be configured to identify the syntactic elements from natural language passages that satisfy the set of similarity criteria and identify a first set of word clusters from the identified syntactic elements. Each of the first set of word clusters are classified according to a syntactic element of a first set of syntactic elements.

Similarly, in embodiments, the natural language sorter 313 can be configured to identify a second set of word clusters from the first input query 320. Each of the second set of word clusters can be classified according to a syntactic element of a second set of syntactic elements.

In embodiments the grammar translator 314 can be configured to generate the second input query 322 based on natural language passages that satisfy the set of similarity criteria and the first input query 320. In embodiments, the grammar translator 314 can use various natural language processing techniques to generate the second input query 322. For example, in embodiments, the grammar translator 314 can perform grammar translation of the first input query 320 to identify sentence structure of the first input query and insert context from the set of candidate answers 310 in accordance with grammatical rules.

In embodiments, the grammar translator 314 can generate the second input query based on syntactic elements from the natural language passages that satisfy the similarity criteria (e.g. the first set of syntactic elements) that are missing from the first input query 320 (e.g. the second set of syntactic elements). For example, the grammar translator 314 can be configured to determine, by comparing the first and second sets of syntactic elements, that at least a first word cluster from the natural language passages that satisfy the set of similarity criteria is classified according to a prepositional phrase, term, synonym, adjective, adverb, or other syntactic element that is not present in the first input query 320.

For example, the input query of "what drugs are used for diabetes?" can include word clusters classified according to parts of speech including a subject, a verb, and an object. The set of candidate answers 320 could have word clusters classified according to other types of syntactic elements. For example, the first set of word clusters could include word clusters classified as adjectives. The grammar translator 314 could be configured to select word clusters from the set of candidate answers that are classified according to syntactic elements not present in the input query. Thus, the grammar translator 312 could select a word cluster from the first set of word clusters that is classified as an adjective and use the word cluster to generate the second input query by using grammar translation to insert the word cluster into the first input query 320.

In some embodiments, the grammar translator 314 can be configured to generate input queries by replacing word clusters in the first input query 320 with one or more similar word clusters in the first set of word clusters. For example, in embodiments, a word cluster of the first set of word clusters could be classified according to the same or substantially similar syntactic element of a word cluster in the first input query 320. The grammar translator 314 could generate the second input query 322 by replacing the word cluster in the first input query 320 with the word cluster from the first set of word clusters.

For example, an input query of "what drugs are used for diabetes?" could have word clusters including a word cluster of "are used for" that is classified as a verb. In embodiments the grammar translator 314 could replace the word cluster with another verb word cluster to generate the second input query 322. For example, "are used for" could be replaced with a word cluster, such as "are prescribed for", from the set of candidate answers 310. Thus, the second input query 322 could be "what drugs are prescribed for diabetes?"

The grammar translator 314 can be configured to determine that word clusters are classified according to the same or substantially similar syntactic element if they achieve a syntactic similarity criterion. In embodiments, the syntactic similarity criterion includes determining that the first word cluster and the second word cluster are classified as the same part of speech.

The query attribute analyzer 316 can be configured to analyze input queries to identify input query attributes. Input query attributes can be characteristics corresponding to an input query which are related to sentence structure, syntactic content, semantic content, or other characteristics of the input query. For example, in embodiments, input query attributes can include whether an input query is written in an active voice or passive voice, the position of prepositions in the input query, and other attributes.

In embodiments, the query attribute analyzer 316 can be configured to compare input query attributes to input query criteria and determine whether the input query attributes satisfy the input query criteria. In embodiments, input query criteria can include a set of preferred characteristics for generated input queries. For example, in some instances, it could be preferred that input queries are presented in active voice rather than passive voice. Accordingly, the query attribute analyzer can be configured to determine whether generated input queries of the query generator 312 satisfy that criterion.

For example, in embodiments, the second input query 322 could include a plurality of word clusters arranged in a first order. The query attribute analyzer 316 could be configured to determine, based on the first order of the plurality of word clusters, a set of input query attributes for the second input query 322. For example, in embodiments, the first order of the plurality of word clusters could include an object word cluster followed by a verb word cluster followed by a subject word cluster. From the order of word clusters (object, verb, then subject) the query attribute analyzer 316 could determine that the input query is written in a passive voice.

The query attribute analyzer 316 can be configured to compare the set of input query attributes to the set of input query criteria and determine whether the set of input query attributes does not satisfy the set of input query criteria. As described herein, in embodiments, an input query criterion could include having an input query written in an active voice. Accordingly, the query attribute analyzer 316 could determine from the first order of word clusters that the second input query 322 does not satisfy the set of input query criteria.

The query attribute analyzer 316 can be configured to trigger the grammar translator to generate, an additional input query in response to determining that the set of input query attributes does not satisfy the set of input query criteria. For example, the query attribute analyzer 316 could be configured to trigger the grammar translator 314 to generate an input query including the plurality of word clusters arranged in a second order that satisfies the set of input query criteria.

In embodiments, the query scoring 318 can be configured to generate a query confidence value for the second input query 322. In embodiments, the query confidence value can be a numerical representation of confidence of the query generator 312 in the likelihood of the second input query 322 being clarified relative to the first input query 320. In embodiments, the second input query 322 can be presented to a user along with the query confidence value. In some embodiments, the query confidence value can be classified according to various confidence buckets that indicate a general label for the score. The various confidence buckets could be defined according to one or more thresholds which indicate a general level of confidence. For example, a first confidence bucket could include query confidence values that are indicated as being "preferred", a second confidence bucket could include query confidence values that are indicated as being "for consideration" and a third confidence bucket could include query confidence values that are indicated as being "not recommended.

In embodiments, portions of the generated input query could be color coded to indicate the confidence value score for the input query. For example in embodiments, preferred confidence values could be colored green, for consideration values could be colored yellow and not recommended confidence values could be colored red. In some embodiments, various portions of the generated input query could be color coded. For example, in embodiments, the second input query 322 could have added word clusters and/or new word clusters color coded to identify changes in the second input query 322 relative to the first input query 320.

In embodiments, the query generator 312 can be configured to display the second input query 322 to a user. For example, the query generator 312 could use GUI 204 (FIG. 2) to display the second input query 322. In some embodiments, the GUI 204 could display the second input query 322 with the inserted and/or replacement word clusters having a visual emphasis. For example, the inserted and/or replacement word clusters could be highlighted with colors that indicate confidence value score for the inserted and/or replacement word clusters, as described herein. In some embodiments, a user could have multiple word clusters displayed to a user for selection by the user. For example, in embodiments, the second input query 322 could be presented in an input bar. A user interacting with the GUI 204 could swipe in a direction on a display to toggle between one or more word clusters generated for replacement and/or insertion in the first input query 320. In embodiments, highlighted portions of the second input query 322 could be selected, via a click or screen gesture using the GUI 204, which can allow for manual selection of contexts for the second input query 322, based on user preference.

Figure 4A:
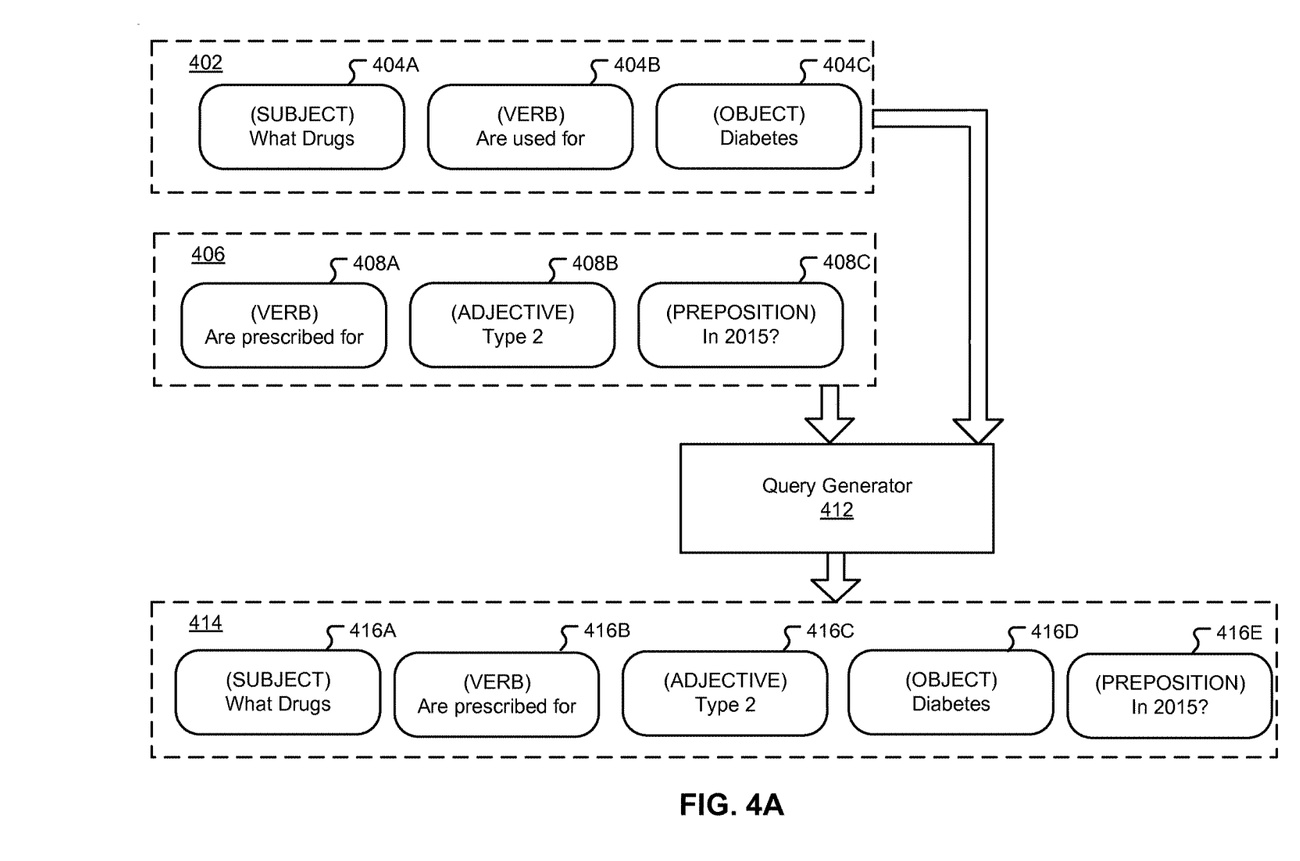
FIG. 4A-4B depicts example diagrams of input query disambiguation in a question-answering environment, according to embodiments of the present disclosure.

Referring now to FIG. 4A an example diagram of input query disambiguation with a query generator 412 can be seen, according to embodiments of the present disclosure. The diagram can include a first input query 402, a second set of word clusters 406, a query generator 412, and a second input query 414.

The first input query 402 can be the same or substantially similar as described herein. In embodiments, the first input query 402 can be received by a QA system for generation of a set of candidate answers. In embodiments, the first input query 402 can be analyzed for ambiguity (such as by ambiguity analyzer 302 (FIG. 3)). The first input query 402 can include a first set of word clusters 404A-404C. The first set of word clusters 404A-404C can include a first word cluster 404A, a second word cluster 404B, and a third word cluster 404C. The word clusters can be the same or substantially similar as word clusters as described herein. Each of the first set of word clusters 404A-404C can be classified according to a syntactic element of a set of syntactic elements. As seen in FIG. 4A, the first set of word clusters 404A-404C are classified according to various parts of speech. For example, the first word cluster 404A can be classified as a subject, the second word cluster 404B can be classified as a verb, and the third word cluster 404C can be classified as an object.

As described herein, the second set of word clusters 406 can include word clusters 408A-408B identified from natural language passages in candidate answers generated in response to input query 402. The word clusters 408A-408C can be identified from natural language passages that have syntactic and/or semantic similarity with the first input query 402, as described herein.

The query generator 412 can be configured to generate the second input query 414 based on the input query 402 and the second set of word clusters 406. The query generator 412 can be the same or substantially similar as described herein.

The second input query 414 can be generated including word clusters 416A-416E. As seen in FIG. 4A query generator 412 has generated the second input query 414 with additional context relative to the first input query 402. For example, word clusters 408A, 408B, and 408C can be seen, used to replace and/or add context to the first input query 402. The first word cluster 404B from the first input query has been replaced with word cluster 408A from the second set of word clusters. Additionally, word clusters 408B and 408C, which are classified as an adjective and a preposition, respectively, have been added to the first input query 402 which lacked a word cluster classified as an adjective or a preposition.

As described herein, the query generator 412 can be configured to replace and/or add context from word clusters to form the second input query 414. As described herein, query generator 412 can use grammar translation to locate word clusters 416A-416D into position in the second input query 414 that satisfies natural language grammatical rules.

Figure 4B:
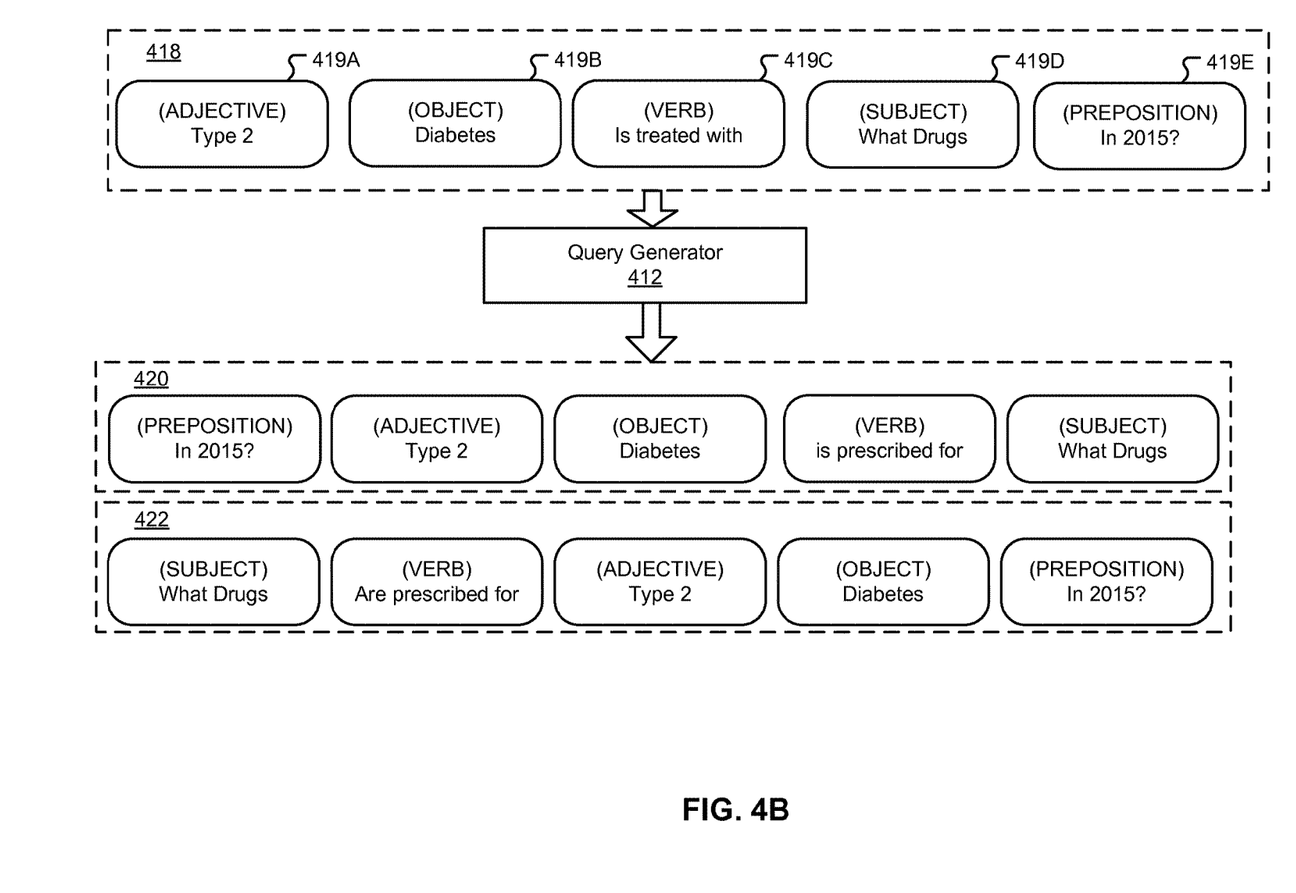

Referring now to FIG. 4B an example diagram of input query disambiguation with a query generator 412 can be seen, according to embodiments of the present disclosure. The diagram can include a second input query 418, the query generator 412, a third input query 420, and a fourth input query 422.

As described herein, in embodiments, the query generator 412 can be configured to modify the second input query 418 to generate input queries to satisfy a set of input query criteria. As described herein, the set of input query criteria can be a set of preferred attributes for input queries generated by the query generator 412. For example, in some instances, it could be preferred that input queries are presented in active voice rather than passive voice. In certain instances, it could be preferred that input queries are presented in a passive voice rather than an active voice. In some embodiments, positions of particular word clusters, such as a word cluster classified as a preposition, could be preferred over other positions in the input query. For example, it could be preferred that the input query begins with the preposition. In some instances, it could be preferred that a preposition ends the input query.

For example, in embodiments, the second input query 418 could include word clusters 419A-419E arranged in a first order. The query generator 412 could be configured to determine, based on the first order of the word clusters 419A-419E, a set of input query attributes for the second input query 418. For example, the order of word clusters 419A-419E may include an object word cluster, followed by a verb word cluster, followed by a subject word cluster. From the order of word clusters (object, verb, subject) the query generator 412 could determine that the second input query 418 is written in a passive voice.

The query generator 412 can be configured to generate additional input query (e.g. the third input query 420 and fourth input query 422) in response to determining that the second input query 418 does not satisfy the set of input query criteria. For example, the query generator 412 could be configured to generate the third input query which repositions the preposition 419E to the beginning of the query. Additionally, the query generator 412 could be configured to generate the fourth input query 422 with word clusters arranged in a second order (subject, verb, object) that makes the query written in an active voice.

Figure 5:
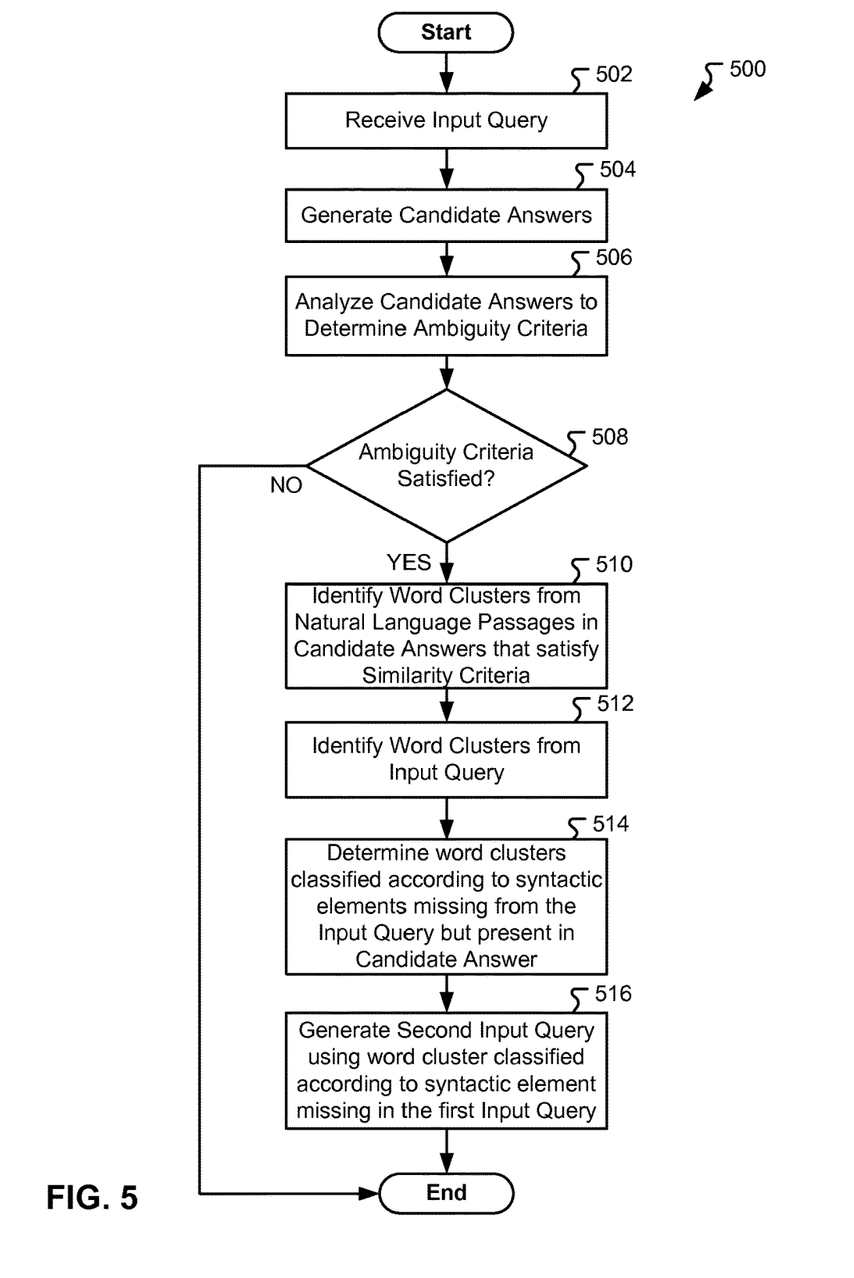
FIG. 5 depicts a flow chart diagram of a method of input query disambiguation in a question-answering environment, according to embodiments of the present disclosure.

Referring now to FIG. 5, a flowchart diagram of a method 500 can be seen, according to embodiments of the present disclosure. The method 500 can includes, in operation 502, receiving an input query. The input query can be the same or substantially similar as described herein. The method 500 can include, in operation 504, generating a set of candidate answers. In embodiments, the input query can be submitted in natural language text form from a user for generation of a set of candidate answers by a QA system. In embodiments, the set of candidate answers can be natural language passages generated by the QA system from a corpus of information, as described herein.

The method 500 can include, in operation 506, analyzing the set of candidate answers to determine whether the input query satisfies a set of ambiguity criteria. As described herein, the set of ambiguity criteria can be characteristics of the set of candidate answers that can indicate that the input query is ambiguous. If the ambiguity criteria are satisfied, then in decision block 508, the method 500 can progress to operation 510. If the set of ambiguity criteria are not satisfied, then in decision block 508, the method 500 can end.

The method can include, in operation 510, identifying a first set of word clusters in the set of candidate answers. As described herein, word clusters can be groups of one or more words that are defined according to syntactic elements of natural language. As described herein, the first set of word clusters can be identified from natural language passages in the set of candidate answers that satisfy a set of similarity criteria. In embodiments, natural language passages with similar syntactic and/or semantic content can improve disambiguation of the input query. The method 500 can include, in operation 512, identifying a second set of word clusters from the input query.

The method can include, in operation 514, determining word clusters of the first set of word clusters classified according to syntactic elements missing from the input query. As described herein, one or more word clusters can be identified from the natural language passages that are classified according to syntactic elements not present in the input query. For example, in embodiments, the input query could include a subject, verb, and object. However the query could be missing an adjective and/or preposition that are present in the second set of word clusters. The method can include, in operation 516, generating a second input query using the first word cluster and the first input query.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of query disambiguation in a question-answering environment, the method comprising:
    identifying, using a first natural language processing technique, a first set of word clusters in a first candidate answer of a plurality of candidate answers generated in response to a first input query for a question-answering system, the first set of word clusters including a first word cluster, each of the first set of word clusters classified according to a semantic term of a first set of semantic terms and a syntactic element of a first set of syntactic elements, wherein one or more syntactic elements of the first set of syntactic elements are a first set of parts of speech and the identification of the first set of word clusters includes tagging the first set of semantic terms and the first set of syntactic elements;
    identifying, using the first natural language processing technique, in the first input query, a second set of word clusters, each of the second set of word clusters classified according to a semantic term of a second set of semantic terms and a syntactic element of a second set of syntactic elements, wherein one or more syntactic elements of the second set of syntactic elements are a second set of parts of speech and the identification of the second set of word clusters includes tagging the second set of semantic terms and the second set of syntactic elements;
    determining, by comparing the first and second sets of semantic terms and the first and second set of syntactic elements, respectively, that the first word cluster is classified according to a first semantic term and a first syntactic element that is not present in the second set of semantic terms and the second set of syntactic elements, respectively;
    determining, using a second natural language processing technique, a set of domains from the first set of word clusters, each of the set of domains corresponding to a topic, and wherein at least one domain of the set of domains is an ontological domain;
    determining a number of domains in the set of domains;
    determining an amalgamated confidence value for the first candidate answer; and
    wherein the determining that the first word cluster is classified according to a syntactic element not present in the second set of syntactic elements, and generating the clarification query in response to determining that the amalgamated confidence value achieves a first ambiguity criterion and the number of domains achieves a second ambiguity criterion, wherein the second ambiguity criterion is based on at least a ratio of the number of domains to the number of candidate answers in the plurality of candidate answers; and
    generating, using a third natural language processing technique, a user-display clarification query using the first input query and the first word cluster; and
    providing, using a display, the user input query to a user that provided the first input query.

2. The method of claim 1, wherein the first word cluster is classified according to a second syntactic element and a second word cluster of the second set of word clusters is classified according to a third syntactic element, and wherein the method further comprises:
    determining that the first syntactic element and the second syntactic element achieve a similarity criterion; and
    generating, by replacing the second word cluster with the first word cluster, a third input query, the third input query generated in response to determining that the first and second syntactic elements achieve the similarity criterion.

3. The method of claim 1, wherein the first natural language processing technique and second natural language processing technique include using a slot grammar parser.

4. The method of claim 1, wherein the clarification query includes a plurality of word clusters arranged in a first order, and wherein the method further comprises:
    determining, based on the first order of the plurality of word clusters, a set of input query attributes for the clarification query, the set of input query attributes including at least a first threshold for comparing the parts of speech and a second threshold for comparing the order of syntactic elements among the plurality of word clusters;

determining, by comparing the set of input query attributes to a set of input query criteria, that the set of input query attributes does not satisfy the set of input query criteria; and generating, in response to determining that the set of input query attributes does not satisfy the set of input query criteria, a third input query including the plurality of word clusters arranged in a second order.

5. The method of claim 4, wherein the clarification query including the plurality of word clusters arranged in the first order is structured to have a passive voice and the third input query including the plurality of word clusters arranged in the second order is structured to have an active voice.

6. The method of claim 1, further comprising:
displaying, using a graphical user interface, the clarification query;
identifying, using a visual emphasis in the graphical user interface, the first word cluster;
toggling, between the clarification query and the first input query, in response to receiving one or more user inputs via the graphical user interface, the one or more user inputs corresponding to the visual emphasis of the first word cluster.

7. The method of claim 1, further comprising:
receiving the first input query for the question-answering system;
analyzing, using a natural language processing technique, a corpus;
identifying, based on analyzing the corpus, a set of candidate answers for the first input query, the set of candidate answers including the first candidate answer.

8. The method of claim 1, wherein the each candidate answer of the plurality of candidate answers is color coded according to the corresponding amalgamated confidence value.

9. The method of claim 1, wherein syntactic elements further comprise word cluster size.

10. The method of claim 1, wherein the question-answering system employs a restricted syntax to receive the first input query.

11. The method of claim 1, wherein the question-answering system employs a RESTful interface to receive the first input query.

12. The method of claim 1, wherein the user-display clarification query includes candidate answers represented in audio and image formats.

13. The method of claim 1, further comprising, in response to receiving a user interaction with the clarification query, weighting the calculation of confidence values, based on the user interaction.

14. The method of claim 1, wherein the first input query includes audio data.

15. The method of claim 1, wherein the first input query includes image data.

16. The method of claim 1, wherein the first input query includes video data.

* * * * *